March 22, 1927.
A. W. HAWKINSON
BABY WALKER
Filed July 11, 1925
1,622,108
2 Sheets-Sheet 1
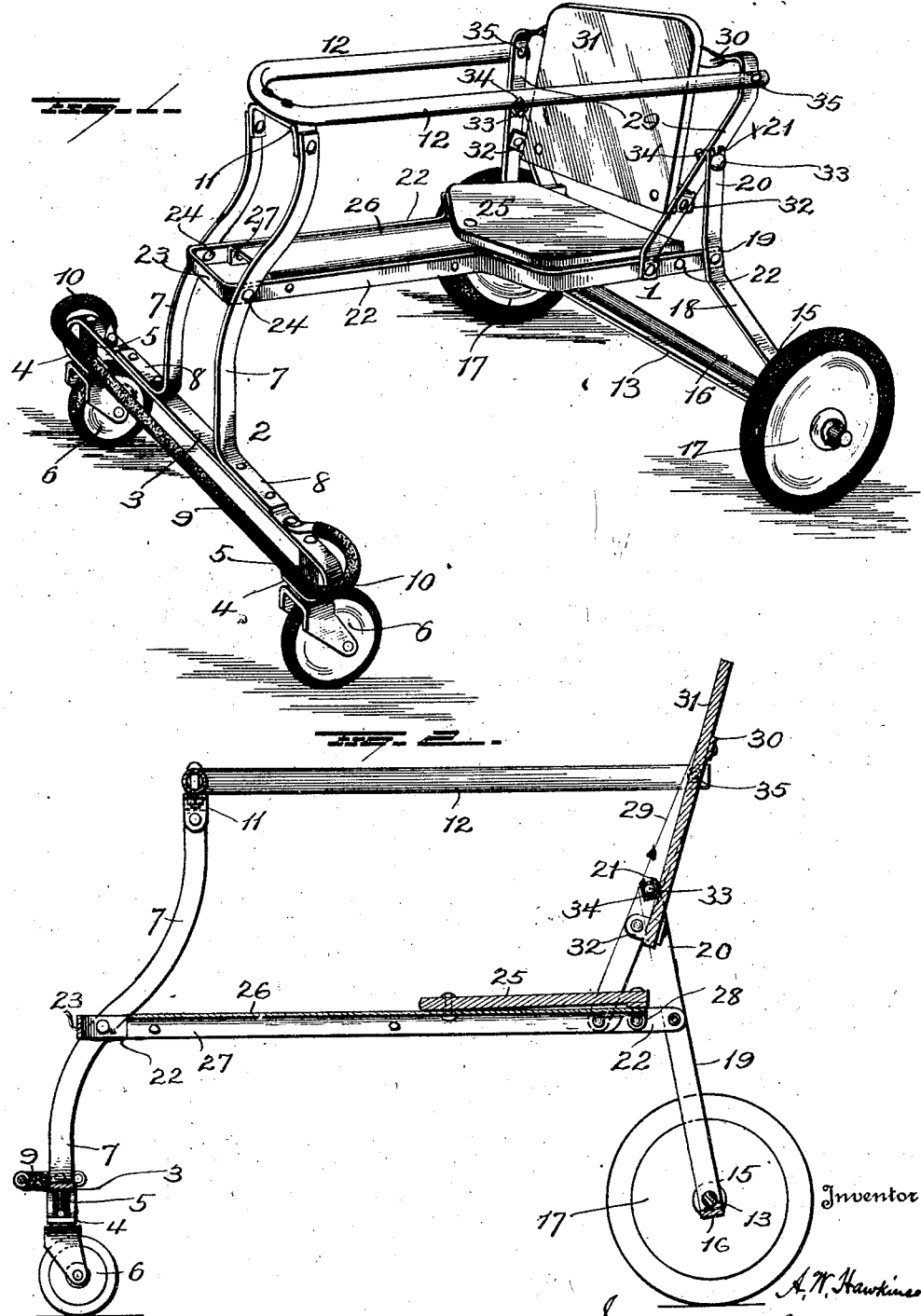

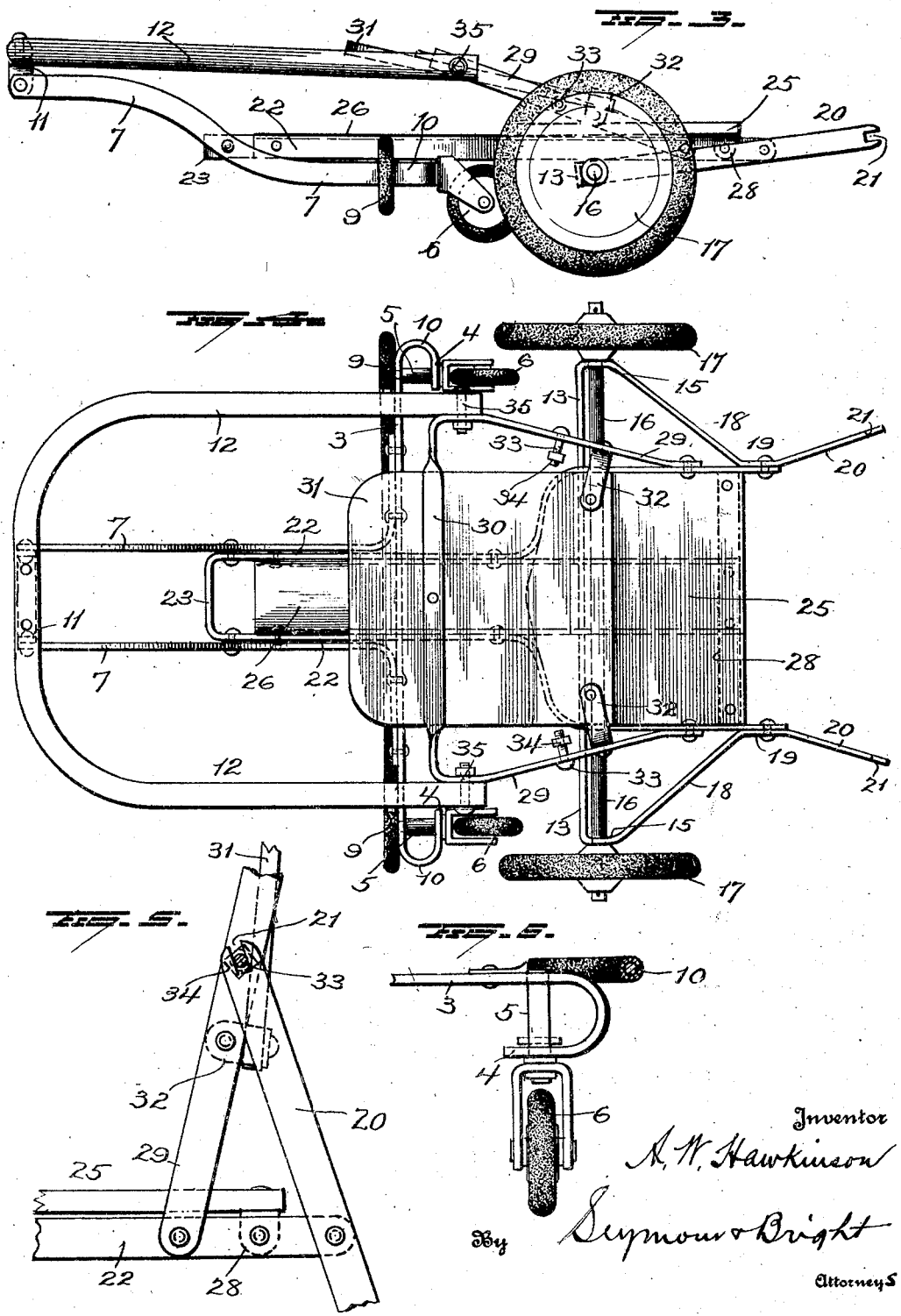

Patented Mar. 22, 1927.

1,622,108

UNITED STATES PATENT OFFICE.

AXEL W. HAWKINSON, OF WASHINGTON, PENNSYLVANIA, ASSIGNOR TO SIDWAY TOPLIFF COMPANY, OF WASHINGTON, PENNSYLVANIA.

BABY WALKER.

Application filed July 11, 1925. Serial No. 43,035.

This invention relates to improvements in baby walkers,—one object of the invention being to provide a simple and efficient device of this character which may be readily collapsed but which, when in use, shall be light but substantial in construction and capable of supporting the child either in an upright walking position or in a sitting position.

With this and other objects in view, the invention consists in certain novel features of construction and combinations of parts as hereinafter set forth and pointed out in the claims.

In the accompanying drawings,—
Figure 1 is a view illustrating my improvements.

Figure 2 is a view in longitudinal section.
Figure 3 is a sectional view showing the device collapsed.
Figure 4 is a plan view of the device in collapsed position, and Figures 5 and 6 are detail views.

My improved device includes in its structure a rear frame 1 and a forward frame 2.
The forward frame comprises a cross-bar 3 which may be conveniently made of strap iron (or steel), the respective ends of which are bent downwardly and inwardly to form arms 4 having suitable openings through which the vertical spindles 5 of caster wheels 6 pass,—said spindles also passing through suitable openings near the ends of the bar 3. The front frame also includes two, approximately S-shape uprights 7—7 which may be also made of strap iron and these bars 7 are provided at their lower ends with lateral arms 8 which are disposed upon and securely riveted to the front cross-bar 3. A guard rail or bumper 9 is disposed in front of the cross-bar 3 and provided with curved ends 10 which are secured to said cross-bar near respective ends thereof. The upper ends of the curved uprights 7 are pivotally connected to respective ends of a bracket 11 secured to the forward end of a U-shaped upper horizontal frame or rail 12 which may be utilized as a hand rail and body support for the child.

The rear frame 1 includes a bottom bar 13 having upwardly projecting portions 15 which are perforated for the accommodation of a rear axle 16 which projects at its respective ends beyond the frame 1 and passes through the hubs of rear wheels 17.
The rear frame may be made of strap iron (or steel) and from the portions 15, arms 18 project upwardly and inwardly, then vertically as at 19 and then upwardly and outwardly as at 20,—the upper ends of the parts 20 of the rear frame having open notches or recesses 21. The rear frame above described may be conveniently made in a single piece.

A seat frame is located betwen the front and rear frames and this seat frame includes a bar of strap metal so bent as to form members 22 connected at their forward ends as at 23 and disposed between the curved uprights 7 intermediate of the upper and lower ends of the latter and pivotally connected thereto as at 24. The rear portions of the members 22 of the seat frame extend outwardly and then rearwardly to conform to the outline of a seat 25. A plate 26 is disposed between the members 22 of the seat frame and this plate is provided at its side edges with depending flanges 27 riveted to said side members of the seat frame. The flanged plate extends rearwardly under the seat and is riveted to a cross-bar 28, the ends of the latter being secured to the rear portions of the seat frame members, and said seat is riveted to this cross-bar and also to the plate 26. The seat frame members are pivotally connected at the rear of said seat frame to the vertical portions 19 of the side members of the rear frame 1, and to side members of the seat frame, somewhat in advance of the pivotal connection of the seat frame with the rear frame, the side members 29 of a back frame are pivotally connected. The back frame includes a cross-bar 30 to which a back 31 is secured and this back is also connected with the side members of the back frame by means of angles 32.

Headed bolts 33 are passed through the side members of the seat frame and are provided with nuts 34. When the device is in normal operative position as shown in Figure 1, the bolts 33 will receive the notched or slotted upper ends of the side rear frame members so that the latter may be disposed between the heads on said bolts and the side members of the back frame, in which position the parts may be held securely by tightening the nuts 34 on said bolts 33.

To collapse the device, the operator will loosen the nuts 34 and after pressing forwardly against the back sufficiently to release the rear frame from the bolts, he will then turn the rear frame so that the portion thereof which carries the axle will be moved under the seat frame and he will then move the back frame and top frame forwardly so that the curved uprights will pivot on their connections with the forward end of the seat frame and cause the portion of the front frame which carries the caster wheels to move rearwardly under the seat frame. These movements are permitted by reason of the fact that the rear ends of the side members of the U-shaped frame 12 are pivotally connected with the back frame as shown at 35 and it may be here stated that the upper frame or body supporting rail 12 may conveniently consist of metal tubing. And it may be also stated that the guard rail 9 will preferably be covered with rubber or other yielding material.

Having fully described my invention what I claim as new and desire to secure by Letters-Patent, is:

1. In a device of the character described, the combination with wheeled front and rear frames, of a seat frame pivotally connected at its respective ends with said front and rear frames, a back frame detachably engaged with the upper end of said rear frame and pivoted to the seat frame in advance of said rear frame, and an upper frame pivotally connected at its forward end with the upper end of the front wheeled frame and pivotally connected at its rear end with said back frame, said upper frame being adapted to rest on the seat frame in collapsed condition with the back frame swung forwardly within the upper frame and the front wheeled frame being adapted to simultaneously swing rearwardly under the seat frame, and the rear wheeled frame being adapted to swing forward under the seat frame when disengaged from the back frame.

2. In a device of the character described, the combination with wheeled front and rear frames, the front frame including upright members, of a seat frame pivotally connected at its front end with the upright members of the front frame and also pivotally connected at its rear end with the rear frame, a back frame pivoted to the seat frame in advance of the rear frame, means for detachably connecting the upper end of the rear frame to the back frame between the upper and lower ends of the latter, and an upper bracing frame pivotally connected at its rear end with the upper end of the back frame and pivotally connected at its front end with the upper end of the front frame.

In testimony whereof, I have signed this specification.

AXEL W. HAWKINSON.